E. GEORGE, Jr.
UNCOUPLING AND CENTERING DEVICE FOR CAR COUPLINGS.
APPLICATION FILED DEC. 2, 1916.
1,235,889.
Patented Aug. 7, 1917.
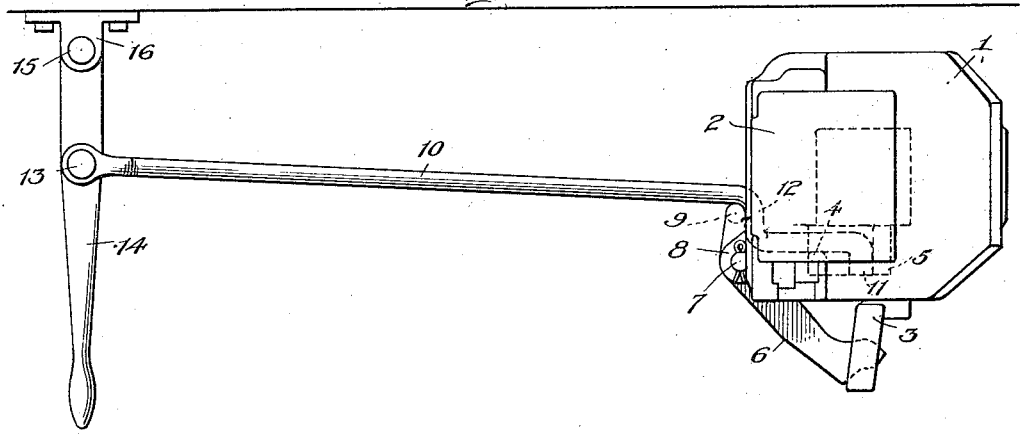
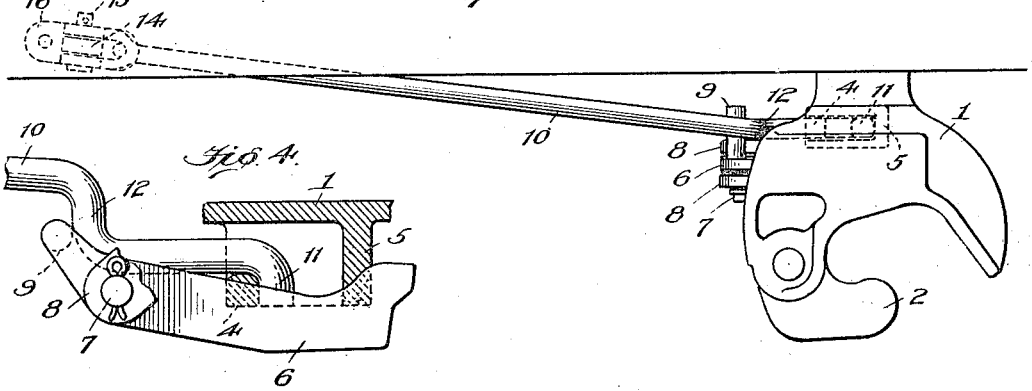

UNITED STATES PATENT OFFICE.

ENOCH GEORGE, JR., OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

UNCOUPLING AND CENTERING DEVICE FOR CAR-COUPLINGS.

1,235,889.     Specification of Letters Patent.     Patented Aug. 7, 1917.

Application filed December 2, 1916. Serial No. 134,594.

*To all whom it may concern:*

Be it known that I, ENOCH GEORGE, Jr., a citizen of the United States, residing at Pittsburgh, in the county of Allegheny and State of Pennsylvania, have invented certain new and useful Improvements in Uncoupling and Centering Devices for Car-Couplings; and I do hereby declare the following to be a full, clear, and exact description of the invention, such as will enable others skilled in the art to which it appertains to make and use the same.

My invention relates to certain improvements in car couplers wherein what are commonly termed uncoupling devices are combined with the coupler-head and lock in such manner as to enable lateral shifting of the coupler to be effected by the trainman when a coupling is to be made on curved track.

The main feature of my invention, generally stated, involves a lost motion connection between the coupler and the mechanism for shifting it laterally in its carry-iron, such lost motion enabling the coupler to be unlocked by the shifting mechanism and permitting the shifting force to be applied directly to the coupler head without utilizing the lock actuating device as an intermediary. A secondary feature of my invention involves the combination of a coupler-head having spaced abutments for the engagement of a shifting or operating member, a coupler lock, a lock actuating member, and an operating member having spaced projections for respectively engaging the coupler-head and the lock actuating member, the lock actuating member and the operating or shifting member being independently movable whereby the coupler may be unlocked before the coupler is shifted laterally.

There are minor features of invention, all as will hereinafter more fully appear.

In the drawings chosen for the purpose of illustrating my invention, and which show the preferred form thereof, Figure 1 is a front elevation of a car coupler provided with shifting and uncoupling mechanism embodying my invention.

Fig. 2 is a plan view of the car coupler and the shifting and uncoupling mechanism shown in Fig. 1.

Fig. 3 is a detail view, partly in section and partly in elevation, showing the coacting portions of the coupler and its shifting and uncoupling mechanism in their normal positions when the coupler is locked.

Fig. 4 is a detail view similar to Fig. 3, but illustrating the positions assumed by the parts when the mechanism has been actuated to unlock the coupler and when the coupler is being shifted toward the left from the central positions illustrated in Figs. 1 and 2.

Fig. 5 is a detail view similar to Fig. 3, but showing the coacting parts in the relative position they assume when the coupler is being shifted away from the operator while the coupler lock is in lock-set or unlocked position.

Fig. 6 is a detail perspective view of that end of the lock actuating member which is engaged by the operating member or coupler shifting device.

Like symbols refer to like parts wherever they occur.

I will now proceed to describe my invention more fully, so that others skilled in the art to which it appertains may apply the same.

In the drawings, 1 indicates a coupler-head of the usual vertical plane type provided with a pivoted knuckle 2 having the usual tailpiece with which the lock 3 engages. The lock 3 is preferably of the lock-set class, and knuckle-opening mechanism of any well-known or desired form may be in the coupler, but it is to be understood that the presence or absence of such features in no wise controls or modifies the coaction of the combination which involves my invention.

The coupler-head 1 is provided with spaced abutments 4 and 5, respectively, which are adapted to be engaged by an operating device by means of which the coupler may be shifted laterally in either direction. In the present instance, which is the preferred application of my invention, the lock 3 is of the gravity type, its lower end projects through and below the bottom wall of the coupler-head 1, as shown in Fig. 1, and the spaced abutments 4 and 5 are located on the bottom wall of the coupler-head. The abutment 4 preferably constitutes a support for the inner end of the operating member 10, as well illustrated in Figs. 3, 4 and 5.

The lock actuating device by which the lock 3 is operated is preferably in the form of a bent or angular lever 6 pivoted at 7 between lugs 8 that project from the coupler head 1. This lever is provided with a projection or finger 9 that extends into the path of reciprocation of the operating member or coupler shifting device 10, so that the lock actuating device 6, though disconnected from and permitting independent movement of the operating device, is actuated by said operating device and in turn actuates the coupler lock 3.

In order to secure a loose connection between the coupler head 1 and the operating member 10, for the purpose of affording lost motion between said parts such as will permit the actuation of the lock actuating member 6, the operating member 10 is preferably provided with two projections or shoulders 11 and 12, one (11) being at or adjacent to the inner end of the member and the other (12), which may be conveniently formed as a bend, being located at such a distance from the projection 11 as to effect a complete operation of the lock actuating lever 6 before the projection 11 engages the abutment 4.

The opposite or outer end of the operating member 10 is pivotally connected by means of a pin 13 to a lever 14 which is itself pivotally attached by means of a pin 15 to a bracket 16 secured to the car body adjacent to one side thereof.

The construction and relative arrangement of the coacting elements being substantially such as herein set forth, their mode of operation will be as follows:

When the coupler lock 3 is to be actuated to perform an unlocking movement, either in order to unlock the coupler or to cause an opening rotation of the knuckle 2 after such unlocking, the operator grasps the lever 14 and pulls outwardly upon it. This causes the transversely extending operating bar 10 to slide in its direction of length, thereby causing its bend or shoulder 12 to press upon the lug or finger 9 of the lock actuating lever 6 and effect an unlocking rotation of the latter and a consequent unlocking movement of the lock 3. In Fig. 4 is shown the position of the lock actuating lever 6 corresponding to an extended unlocking movement of the lock 3 executed for the purpose of throwing the knuckle open. Fig. 5 shows the position of the lever corresponding to a lock-set or unlocked position of the coupler lock 3.

When the coupler is to be shifted laterally away from the operator the lever 14 is pushed inwardly toward the center of the car. This causes the operating member 10 to slide inwardly, thus producing, through the engagement of its lug or shoulder 11 with the abutment 5 upon the coupler-head, a corresponding lateral shifting of the coupler of like direction and extent. As shown in Fig. 3, such a shifting of the coupler may be effected without disturbing the lever 6 through which the lock 3 is actuated, or, as illustrated in Fig. 5, this lateral shifting may be effected while the lock 3 is supported in unlocked position. In shifting the coupler laterally toward the side of the car where the operating lever 14 is located, the trainman grasps the lever and swings it outwardly, shifting the attached operating bar 10 until the lug or projection 11 thereof engages the abutment 4 on the coupler-head. This preliminary operation, as heretofore explained, results in such an extended unlocking rotation of the lock actuating lever 6 as corresponds to the unlocking of the coupler and to the outward rotation of the knuckle 2 if knuckle-opening means are incorporated in the mechanism. With the lug 11 of the slidable operating member 10 in engagement with the abutment 4 of the coupler head, an outward pull upon the lever 14 will cause the coupler to be drawn toward the side of the car at which the operator is stationed, as will be readily understood.

I claim:

1. The combination with a coupler having a coupler head provided with spaced abutments, of a coupler lock, means for actuating said lock, and means movable laterally independently of said lock actuating means for shifting said coupler laterally with respect to the car to which it is applied, said lock actuating means being adapted to be operated by said shifting means, and said shifting means having a projection adapted to engage the spaced abutments on the coupler head, whereby a lost motion connection is established between the coupler and the means for shifting the same.

2. The combination with a coupler having a coupler-head, a knuckle and a lock for said knuckle, of means for actuating said lock to unlock said knuckle, and means for shifting said coupler laterally with respect to the car to which it is applied, said means for shifting the coupler laterally involving a member having spaced projections and a lost motion connection with said coupler-head and being adapted to be shifted laterally to thereby actuate said lock actuating means, one of said spaced projections being adapted to engage the coupler head to effect lateral shifting thereof, and another of said spaced projections being adapted to engage said lock-actuating means.

3. The combination with a coupler having a coupler-head, a knuckle and a lock for said knuckle, of a lever pivotally mounted upon said head and adapted to move said lock to unlocked position, and means for shifting said coupler laterally and for actuating said lever, said means including a lever movably connected to the car, and a transversely extending operating member connected to said last named lever and having a lost motion connection with said coupler permitting it to move laterally independent of said coupler head and said first named lever.

4. The combination with a coupler-head having spaced abutments, of a knuckle, a lock for said knuckle, a lock actuating member, and a member having spaced projections respectively adapted to engage said abutments and said lock actuating member.

5. The combination with a car coupler involving a coupler-head having spaced abutments upon its lower side, a knuckle, and a lock for said knuckle, of a lock actuating member pivoted on said coupler head, and means movable laterally with respect to the coupler-head for shifting said coupler laterally and for actuating said pivoted member, said means including a member adapted to engage said pivoted member and also to engage said abutments.

In testimony whereof I affix my signature.

ENOCH GEORGE, Jr.